Oct. 19, 1965  F. T. MELETIOU  3,212,107

BED PAN

Filed May 31, 1963

Inventor:
Frances T. Meletiou,
By Russell, Chittick + Pfund
Attorneys

3,212,107
BED PAN
Frances T. Meletiou, 166 Palmer St., Quincy 69, Mass.
Filed May 31, 1963, Ser. No. 284,413
1 Claim. (Cl. 4—112)

This invention relates to a bed pan and more particularly to a skid resistant bed pan.

In hospitals, nursing homes and similar institutions, a patient confined to a bed is provided with bed pan service. The normal procedure is to place the bed pan on the bottom bed sheet and in the proper position for use of the patient. It is desirable that during such use the bad pan should remain in the proper position on the bed and resist any sliding or displacing movement on the bed sheet. The smooth metal surface of the bottom of the bed pan and the relatively smooth surface of the bottom bed sheet offer little resistance against any displacing movement of the bed pan relative to the sheet.

Accordingly, it is an object of the present invention to provide a bed pan which offers a high degree of resistance against any displacing movement of the bed pan relative to the bed sheet.

Another object of the invention is to provide a non-skid bottom surface for the bed pan which is simple in construction and inexpensive to manufacture and which can be secured to the bed pan without interfering with the normal use of the bed pan.

A still further object of the present invention is to provide a non-skid bottom surface for a bed pan which will remain secured to the bed pan despite its being subjected to the influences of steam and water during the sterilization of the bed pan.

These and other objects and features of my invention will be best understood from the following description and drawings, in which.

Figure 1:
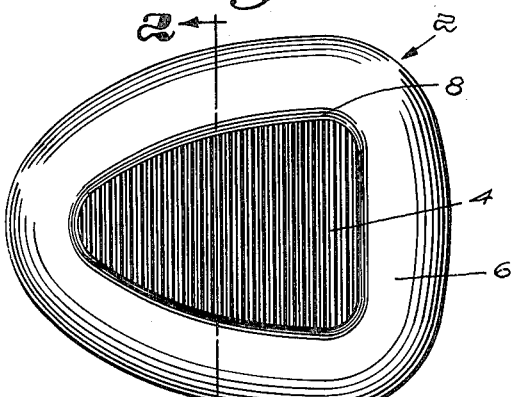
FIG. 1 is a plan view of the bed pan bottom showing the non-skid bottom surface member.

Turning now to the drawings, FIG. 1 shows in plan view the bed pan 2 and a non-skid bottom member 4 secured thereto. The bed pan 2 and the non-skid bottom member 4 can be made of any suitable material which is easily sterilized yet will resist the damaging effects of the steam and high pressure water employed in the sterilization process. Stainless steel and rubber are typical of the materials which can be employed and which have the desired characteristics for the bed pan 2 and non-skid bottom member 4, respectively.

Figure 2:
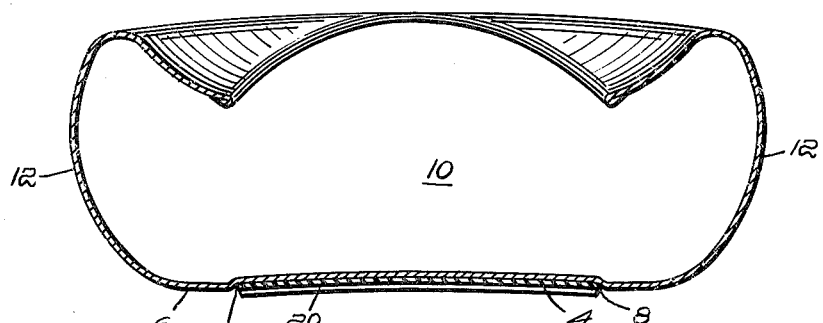
FIG. 2 is a view in cross-section taken on line 2—2 of FIG. 1, and inverted for purposes of clarity.

The bed pan 2 and non-skid bottom member 4 are simple in construction and can be readily manufactured at a relatively low cost. As shown in FIGS. 1 and 2, the bottom wall 6 of the bed pan 2 is constructed with a shallow, generally cordate shaped depression 8 extending inwardly into the chamber 10 formed by the bottom and side walls 6 and 12 respectively, of the bed pan 2. The actual shape of the shallow depression 8 is not signifiicant, however, the shallow depression 8 itself is important because it cooperates with the non-skid bottom member 4 to increase the effectiveness and durability of the bed pan's resistance to skidding. This cooperative relationship is achieved by employing a non-skid bottom member 4 which has been cut to substantially the same contour and size as the shallow depression 8 and secured therein.

Figure 4:
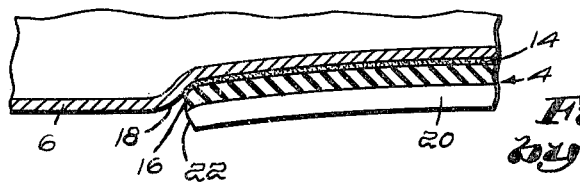

Referring now to FIG. 4, the shaped and sized non-skid member 4 is attached by a layer of adhesive 14 to the bottom wall 6 within the depression 8 so that the edges 16 of the non-skid material 4 abut the sloping peripheral edges 18 of the depression 8. Since the edges 16 of the non-skid material 4 abut the peripheral edges 18 of the depression 8, both the non-skid member 4 and the adhesive layer 14 cooperate with the edges of the depression to produce a junction which is substantially impervious to the steam and water utilized in sterilizing the bad pan.

Figure 3:
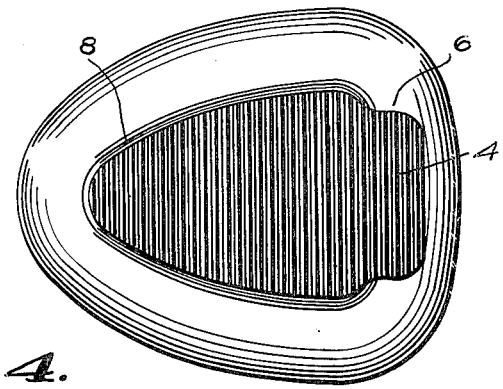
FIG. 3 is a plan view of the bed pan bottom showing a modification of the non-skid bottom surface member; and, FIG. 4 is an enlarged view showing in cross-section the abutting relation of the non-skid bottom surface member and the bottom wall of the bed pan.

A modified configuration for the non-skid material 4 is shown in FIG. 3. In this embodiment the non-skid material 4 extends outwardly and beyond the rear edge of the shallow depression 8 to a point just short of the sloping portion of the rear edge of the bed pan 2. Although this construction exposes the joint between the bottom wall 6 and the non-skid member 4 in the area outside of the depression 8 to the effects of sterilization, it does produce a slightly greater resistance to skidding than the embodiment previously described.

The lower surface of the non-skid material 4 is provided with a series of raised, transversely extending ribs 20 to prevent the bed pan from slipping with respect to the bottom sheet of the bed. The ends 22 of the corrugated ribs 20 are tapered to provide another gripping edge to secure the bed pan against movement in a direction parallel to the ribs 20. Although the non-skid member 4 is shown with corrugated ribs, other patterns obviously could be employed to achieve the desired skid resistance.

Numerous modifications and preferred embodiments of my invention will now be apparent to those skilled in the art and therefore, it is not intended to confine the invention to the precise form shown herein, but rather to limit it in scope to the appended claim.

Having thus described and disclosed the preferred embodiments of my invention, what I now claim as new and desire to secure by Letters Patent of the United States is:

A skid resistant bed pan comprising in combination: a bed pan having a bottom wall and side walls integrally fabricated therewith forming an open-topped chamber, said bottom wall having formed therein a shallow depression shaped generally in the form of an isosceles triangle extending inwardly into said chamber; a flexible rubber anti-skid sheet member having substantially the same contour and size as said depression positioned within said depression in abutting relation to the peripheral edges thereof and adhesively secured to said bottom wall within said depression; a lower surface on said anti-skid member; a plurality of transversely extending raised ribs formed on said lower surface, said ribs terminating in tapered end portions whereby the interaction of said ribs with the surface upon which the bed pan is placed prevents the slippage of said bad pan with respect to said surface.

References Cited by the Examiner
UNITED STATES PATENTS

| | | | |
|---|---|---|---|
| 1,858,752 | 5/32 | Sentney | 248—350 |
| 2,611,903 | 9/52 | Wakeman | 4—112 |
| 2,712,136 | 7/55 | Ring | 4—112 |

LEWIS J. LENNY, *Primary Examiner.*
EDWARD V. BENHAM, *Examiner.*